United States Patent [19]

Lindhorst

[11] Patent Number: 5,601,181
[45] Date of Patent: Feb. 11, 1997

[54] ADJUSTABLE GRAIN ELEVATOR SPOUT

[76] Inventor: Tim J. Lindhorst, 707 280th St., Lone Rock, Iowa 50559

[21] Appl. No.: 447,986

[22] Filed: May 23, 1995

[51] Int. Cl.$^6$ .................................................. B65G 21/10
[52] U.S. Cl. .......................... 198/536; 198/538; 193/25 R; 193/25 E
[58] Field of Search .......................... 193/25 E, 25 R, 193/17, 2 R, 2 A; 198/536, 632, 538; 414/299, 397, 398

[56] References Cited

U.S. PATENT DOCUMENTS

| | | |
|---|---|---|
| 206,001 | 7/1878 | Campbell . |
| 358,052 | 2/1887 | Metcalf . |
| 725,624 | 4/1903 | Leonard ................... 193/25 E |
| 790,073 | 5/1905 | McMyler . |
| 830,957 | 9/1906 | Baier . |
| 1,381,574 | 6/1921 | Ludlam ................... 193/25 E |
| 1,442,521 | 1/1923 | Case . |
| 1,539,559 | 5/1925 | Hamachek . |
| 2,997,150 | 8/1961 | Emanuelson . |
| 3,019,879 | 2/1962 | Wenschlag . |
| 3,266,609 | 8/1966 | Carlson . |
| 3,365,043 | 1/1968 | Heeren . |
| 3,428,156 | 2/1969 | Charyn et al. .......... 193/25 R |
| 3,949,850 | 4/1976 | Schumm . |
| 4,821,861 | 4/1989 | Shanahan . |

*Primary Examiner*—D. Glenn Dayoan
*Attorney, Agent, or Firm*—Zarley, McKee, Thomte, Voorhees, & Sease

[57] ABSTRACT

An adjustable spout for a grain elevator is made of a hollow tube connected to the spout of the elevator and a series of movable buckets hanging from the hollow tube. A frame extends in opposite directions from the tube and includes a number of pulleys at each end. A prime mover is connected to the movable spout for moving a set of cables which are connected to the bottom end of the movable buckets. The prime mover can be remotely controlled to move the adjustable spout back and forth.

23 Claims, 4 Drawing Sheets

ADJUSTABLE GRAIN ELEVATOR SPOUT

BACKGROUND OF THE INVENTION

1. Field of the Invention

The present invention relates to grain elevator spouts. More particularly, the present invention relates to an adjustable grain elevator spout which can be remotely moved back and forth in order to fill a wagon or truck without moving the wagon during the loading.

2. Problems in the Art

When filling a truck or wagon with grain using a typical prior art grain elevator, several disadvantages are encountered. A prior art nonadjustable elevator spout places the grain in a single area of the wagon. This results in an uneven load with the grain being piled higher at the point it comes out of the elevator spout. The only way to overcome this problem is to move the truck forward or backward during the loading of the truck. As a result, the user must climb into the truck, start it and move it forward or backwards. This may be required several times during a load. Not only is this an inconvenience, but it unnecessarily uses fuel and causes unnecessary wear to the truck.

There have been several attempts in the prior art to solve this problem. One prior art system used a pivotal non-flexible spout which could be moved back and forth along a track by turning a crank. Other prior art systems utilized a pivotal non-flexible spout which could be moved back and forth by activating a motor or turning a crank. However, these prior art systems were cumbersome and limited. These systems were permanently mounted to buildings so could only be used for unloading bins from that particular building. Also, these systems were only able to move in two directions along a straight line.

Other prior art systems use a flexible spout which can be moved back and forth. The systems are also limited in that they cannot be remotely controlled, and also can just move in two directions along a straight line.

FEATURES OF THE INVENTION

A general feature of the present invention is the provision of an adjustable grain elevator spout.

A further feature of the present invention is the provision of an adjustable grain elevator spout that is attachable to a conventional grain auger.

A further feature of the present invention is the provision of an adjustable grain elevator spout that can be moved back and forth and can also be rotated.

A further feature of the present invention is the provision of an adjustable grain elevator spout that is remotely controllable.

A further feature of the present invention is the provision of an adjustable grain elevator spout that can be moved back and forth by the use of an electric motor.

A further feature of the present invention is the provision of an adjustable grain elevator spout that can be used to fill a grain wagon or truck to full capacity without moving the wagon or truck during loading.

A further feature of the present invention is the provision of an adjustable grain elevator spout mounted such that it has an in-use position and stowed position.

These as well as other features of the present invention will become apparent from the following specification and claims.

SUMMARY OF THE INVENTION

The adjustable spout of the present invention is adapted to be secured to a spout of a grain auger. The adjustable spout includes a number of movable buckets which can be adjusted back and forth remotely through a winch and the combination of several pulleys and cables.

The adjustable spout of the present invention can be mounted such that it has an in-use position and a stowed position. This way, the elevator can be used to fill wagons as well as grain bins without completely removing the adjustable spout from the elevator.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
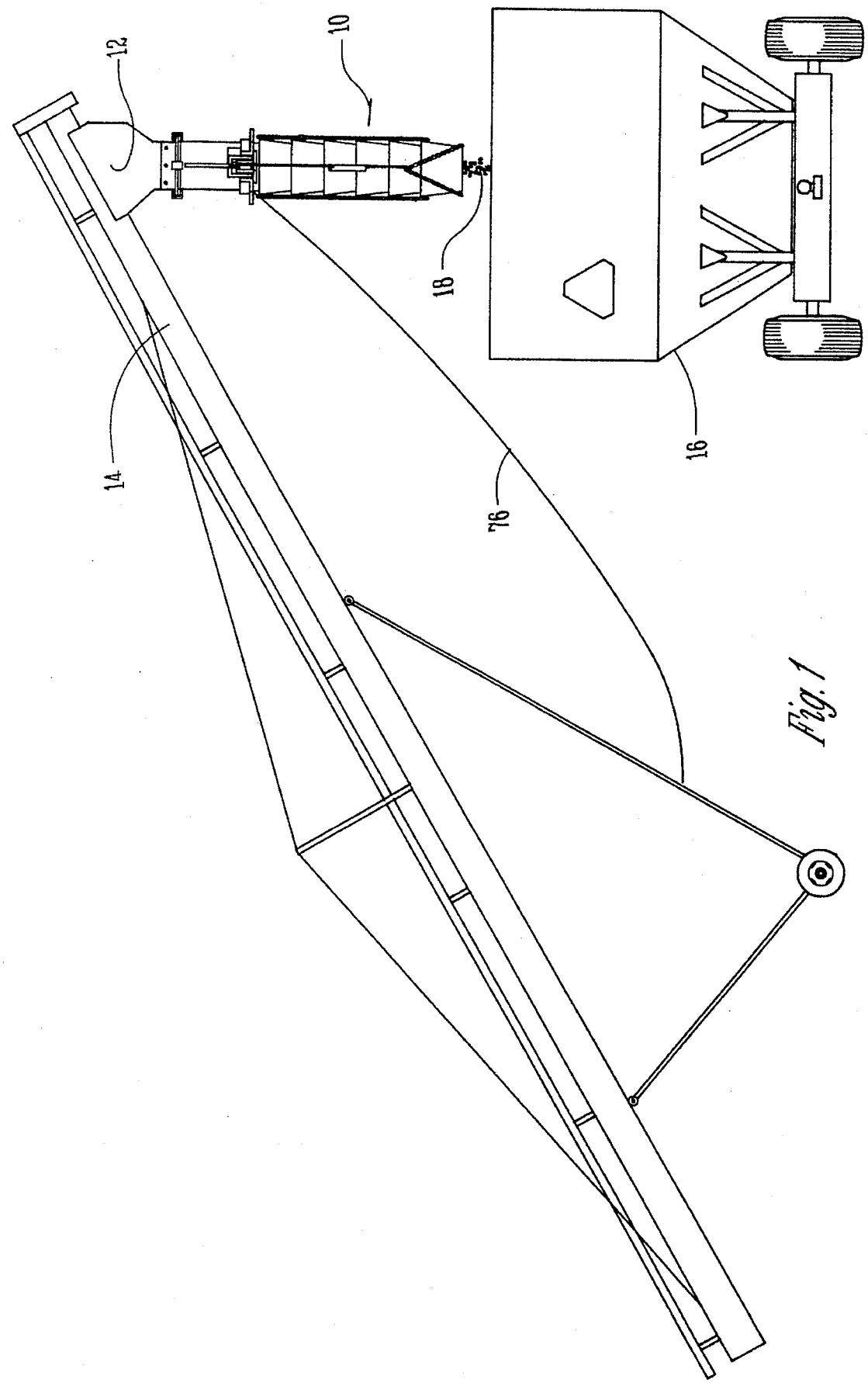
FIG. 1 shows the present invention attached to a grain auger which is used to fill a grain wagon.

FIG. 1 shows an adjustable grain elevator spout 10 attached to the spout 12 of a grain elevator 14. A grain wagon 16 or truck can be positioned underneath the adjustable spout 10 in order to fill the wagon 16 with grain 18 from the elevator 14.

Figure 2:
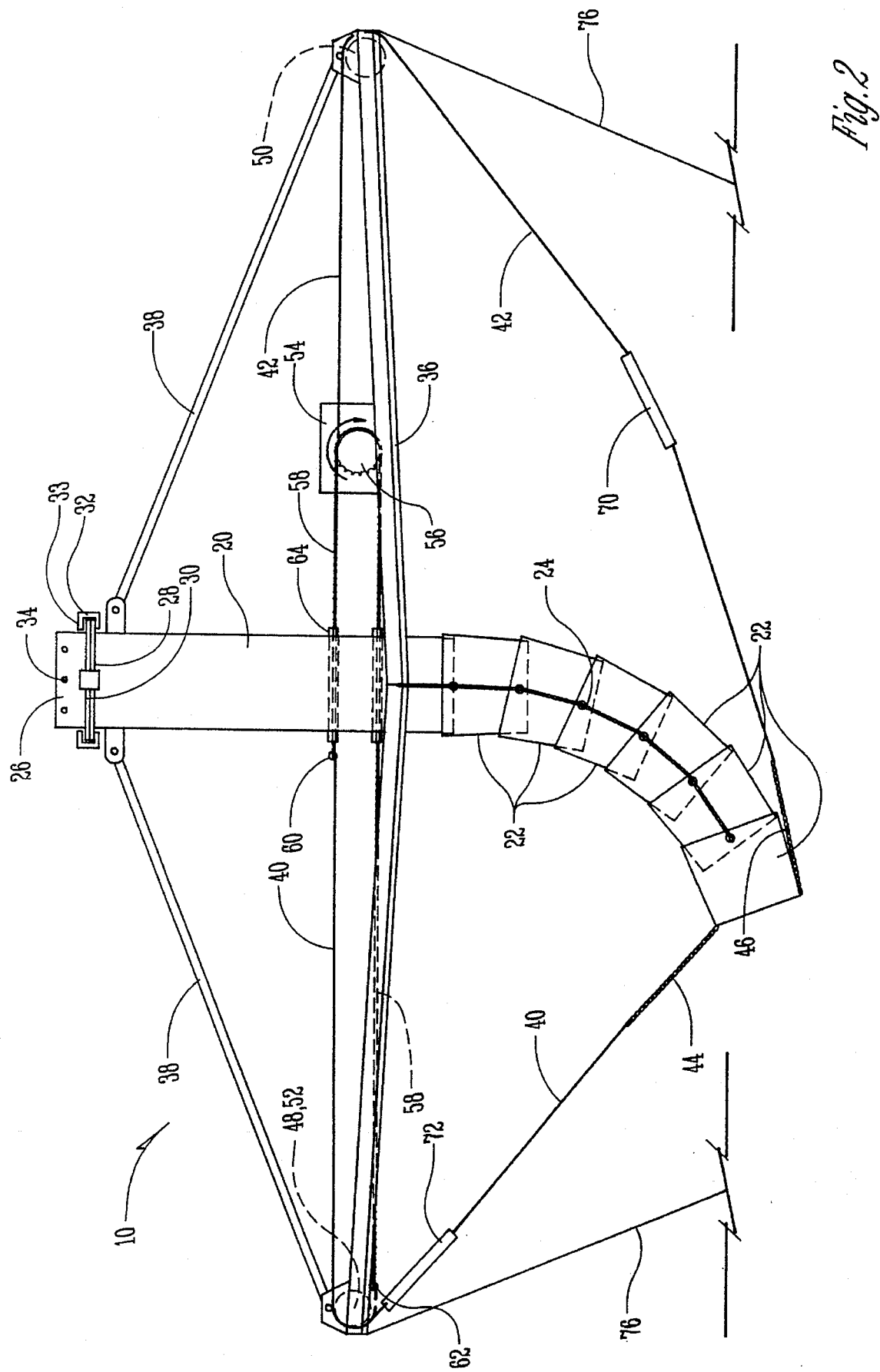
FIG. 2 is a front view of the present invention with the adjustable grain spout moved to the left.

FIG. 2 is a front view of the adjustable grain spout 10. The spout 10 is comprised of a cylindrical tube 20 and a series of movable buckets 22. The tube 20 could take on any shape, but is preferably round to match the shape of the elevator spout 12. The buckets 22 are connected to the tube 20 by a chain 24 which is coupled to the tube 20 and to each individual bucket 22. A second chain (not shown) is configured the same way on the back side of the buckets 22. In this way, the buckets 22 are adapted to be movable back and forth with respect to the tube 20.

The tube 20 is rotatably coupled to the elevator spout 12 by a mounting tube 26. The tube 20 includes a bottom ring 28 which is positioned against a top ring 30 which is a part of the mounting tube 26. Four C-shaped clamps 32 are welded to the bottom ring 28 and extend upward past the top ring 30 where a projection 33 extends over the top of the top ring 30 holding the tube 20 to the mounting tube 26 but allowing for rotation about the top and bottom rings. The mounting tube 26 is then attached to the elevator spout 12 by a number of bolts 34.

The adjustable grain spout 10 includes four lateral support members 36 extending out from the tube 20. The lateral support members 36 are preferably comprised of 1¼ inch× 1¼ inch angle iron. The two front lateral support members 36 are connected to the tube 20 on the front while the two rear lateral support members 36 are connected to the rear of the tube 20. The ends of the support members 36 are coupled with each other forming a diamond-shaped frame as viewed from the top or bottom (not shown). The lateral support members 36 are preferably disposed at a slightly upward angle as they extend outward from the tube 20.

A pair of angle support members 38 are coupled to the tube 20 near the top of the tube and also to the point where the lateral support members are coupled to each other. The angle support members 38 are preferably comprised of two pieces of ½ inch steel rod. The angle support members 38 help support the lateral support members 36 in the position shown in FIGS. 2 and 3.

Figure 3:
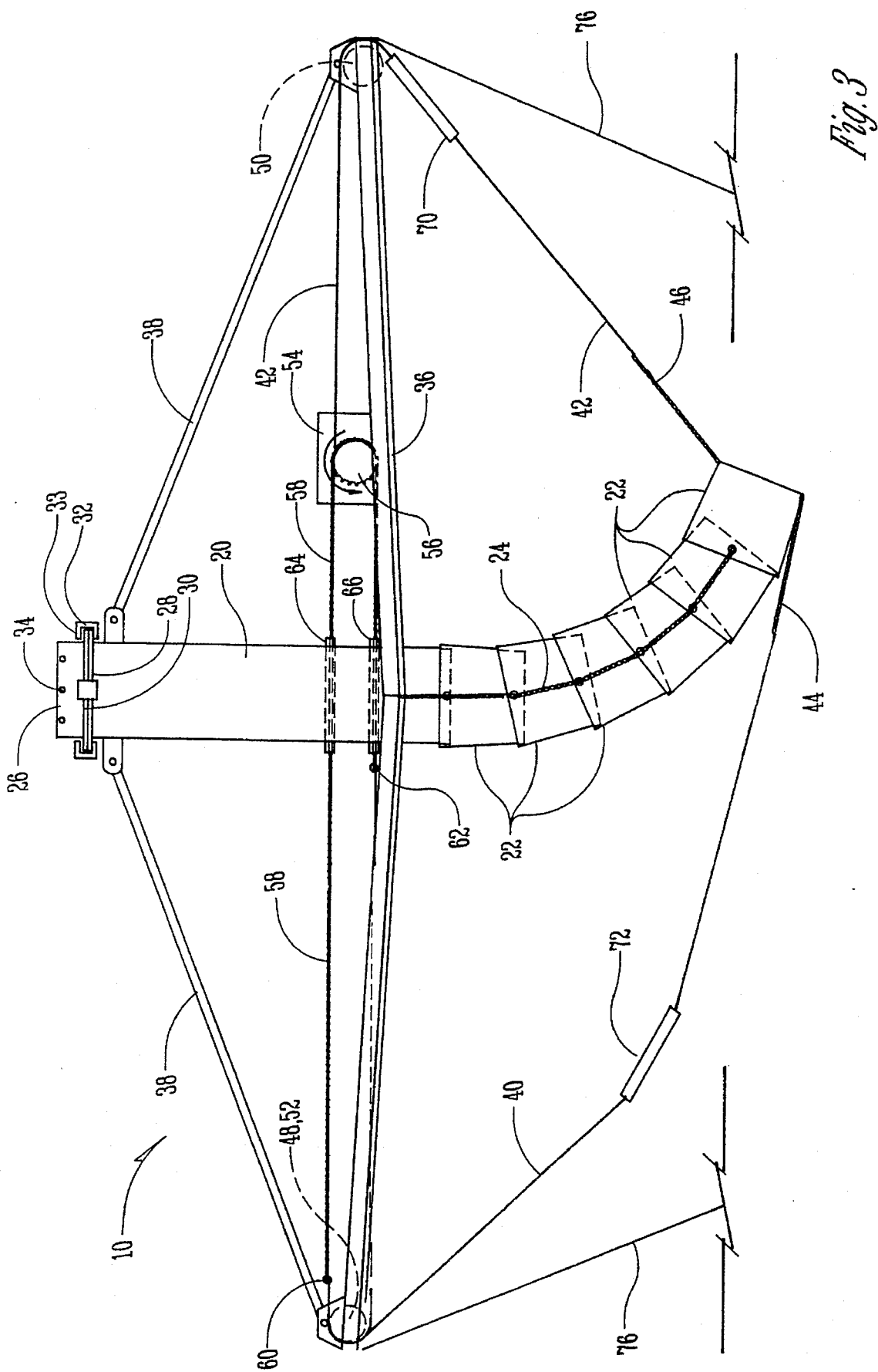
FIG. 3 is a front view of the present invention with the adjustable grain spout moved to the right.

FIG. 2 shows a pair of cables 40 and 42 connected to a pair of chains 44 and 46 respectively. For the purposes of this patent application, the term cable is meant to include any flexible material suitable for use with the present invention, for example, ropes, chains, wires, straps, lines, etc. Also, when referring to the two cables, it is understood that the two cables could actually be one single length of cable. The chains 44 and 46 are each coupled to the sides of the lowest bucket 22 and are also connected to the cables 40 and 42 such that when the cables 40 or 42 are pulled, the chains 44 or 46 will pull the series of buckets 22 either to the left (FIG. 2) or right (FIG. 3).

The cable 40 extends around a pulley 48 (shown by a dashed line in FIG. 2) and the cable 42 extends around a pulley 50 (also shown by a dashed line in FIG. 2). Cable 42 then extends through a top channel 64 and around pulley 52 which is positioned along the same axis as pulley 48. A winch 54 is mounted to the lateral support members 36 and has a sprocket 56 connected to the axle of the winch 54. The winch 54 could be any type of prime mover including, but not limited to, electrical, air, hydraulic, or fuel powered motors, but is preferably a 12 or 110 volt winch. A chain 58, such as a bicycle chain, is positioned around the sprocket 56 such that the winch 54 will move the chain 58 one way or the other depending on the direction of rotation of the winch 54. One end of the chain 58 is attached to the cable 40 by a cable clamp 60. The other end of the chain 58 is attached to the cable 42 by a cable clamp 62. The top channel 64 and a bottom channel 66 are formed in the tube 20 and allow the cables and chain to pass through the center of the tube 20 without making contact with the grain that flows through the adjustable grain spout 10. Preferably, the channels 64 and 66 are made from 1 inch square tubing.

This configuration of cables, chains, pulleys and winch forms a path from the chain 44 to the chain 46 as follows. The chain 44 is connected to the cable 40 which extends around pulley 48 and terminates at the chain 58 at cable clamp 60. The chain 58 extends through the top channel 64 and around the sprocket 56 of the winch 54 and through the bottom channel 66. The chain 58 is connected to the cable 40 by the cable clamp 62. The cable 40 then extends around pulley 48 and through the top channel 64 around pulley 50 and is connected to the chain 46.

The winch 54 is controlled remotely by a control switch which can be mounted somewhere where the user can have easy access. In this way, the spout can be adjusted back and forth by manipulating the winch control switch.

A pair of weights 70 and 72 are attached to the cables 42 and 40 respectively to keep tension on the cables at all times. The weights are positioned such that when the buckets 22 extend to the left or right, the weights are near the pulleys. This helps to keep the winch from pulling the buckets 22 too far to the left or right.

A pair of ropes 76 are attached to the angle support members 38 or the lateral support members 36 near their outside ends to allow a user to remotely rotate the entire adjustable grain spout about the mounting tube 26 by pulling on one of the ropes 76.

The adjustable grain elevator spout operates as follows. When filling a grain wagon or grain truck such as that in FIG. 1, it is desired to evenly distribute the grain in the wagon. Without an adjustable grain spout, the grain will tend to pile higher at the spot directly beneath the elevator spout.

When filling the wagon, the adjustable grain spout 10 can initially be positioned in any position, for example straight down. When the grain is piled high enough in that position, it is desired to place the grain at another target in the wagon. By activating the winch with the remote switch, the adjustable spout 12 can be moved. If the winch rotates the sprocket 56 in a clockwise direction as shown in FIG. 2, the chain 58 pulls on the cable 40 which in turn pulls on the chain 44 moving the series of buckets 22 to the left. At the same time, tension on the cable 42 is lessened allowing the buckets 22 to move to the left. In this position, the weight 70 exerts a downward force on the cable 42 keeping tension in the cable 42 so that it does not come off the pulleys.

When the winch 54 is rotated in a counterclockwise direction as shown in FIG. 3, the chain 58 pulls on the cable 42 which in turn pulls the chain 46 causing the series of buckets 22 to move to the right. At the same time, the tension on the cable 40 is lessened allowing the buckets 22 to move to the right. In this position, the weight 72 exerts a downward force on the cable 40 creating enough tension in the cable 40 to prevent it from moving off of the pulleys. By activating the remote control switch for the winch 54, the buckets 22 can be positioned in any position between the left and right positions shown in FIGS. 2 and 3. Also, by pulling on the ropes 76, the entire adjustable spout end can be rotated, giving the user of the adjustable spout 10 even more flexibility in placing grain in the wagon.

Figure 4:
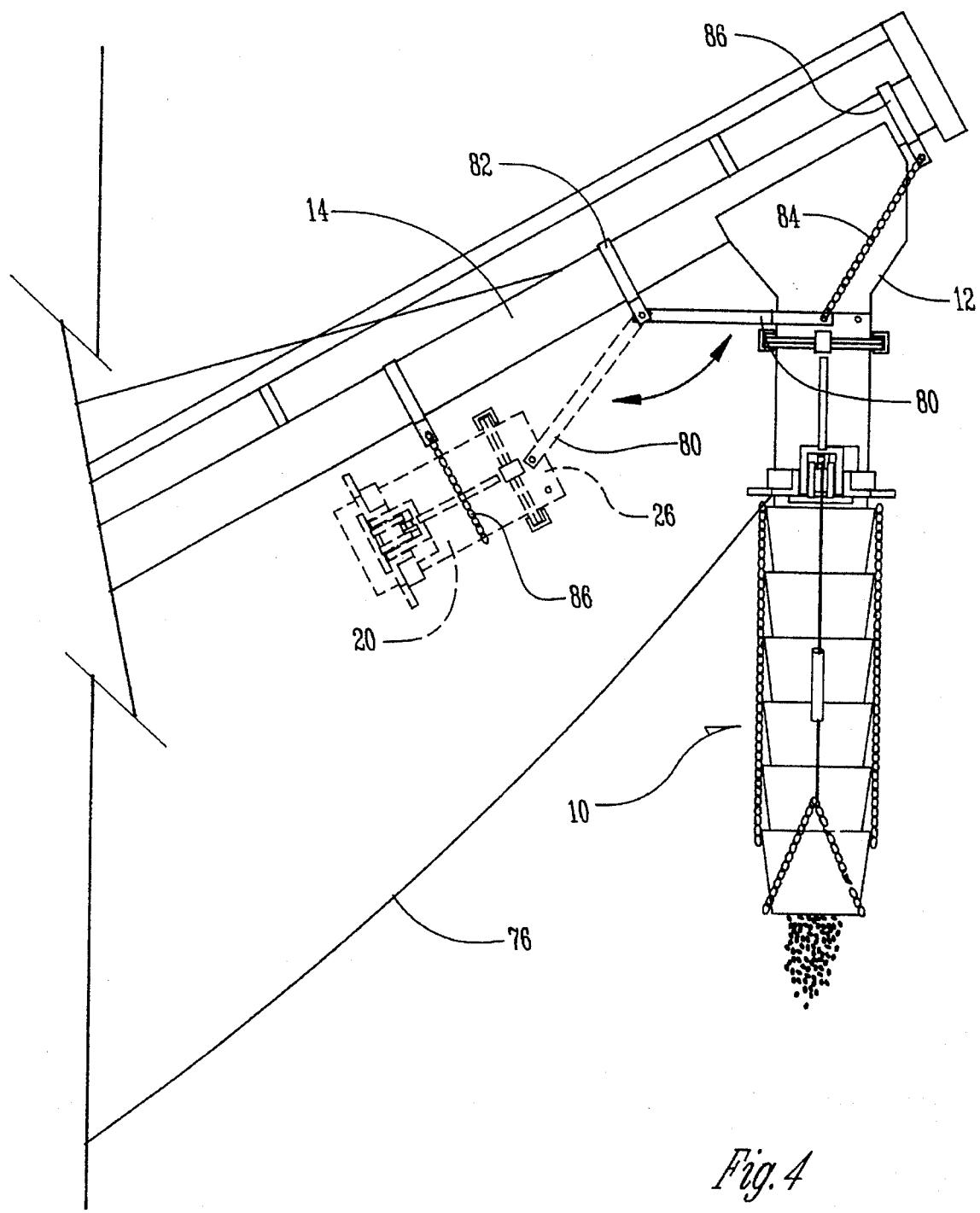
FIG. 4 is a side view of the present invention with an alternative mounting configuration having an in-use position (solid lines) and a stowed position (dashed lines).

The adjustable grain spout 10 can be mounted to the elevator spout 12 in a number of ways. The preferred mounting method is shown in FIGS. 2 and 3 and described above. One alternative mounting configuration is shown in FIG. 4. The configuration shown in FIG. 4 allows the user to move the adjustable grain spout 10 away from the elevator spout 12 in a stowed position when it is not in use. In FIG. 4, the mounting tube 26 is not bolted to the elevator spout 12 but rather is supported by a pair of arms 80. The arms 80 are pivotally attached to the mounting tube 26 at one end and to a round metal band 82 at the other end. The arms 80 are pivotal from a first position near the elevator spout 12 to a second position shown in dashed lines in FIG. 4. The arms 80 are held in the first position by a chain 84 which in turn is supported by a second metal band 86. When the chain 84 is disconnected from the arms 80, the adjustable spout can be moved to the second position shown in dashed lines and supported by a second chain 86 which is wrapped around the elevator 14. In this position, the buckets 22 can either be disconnected from the tube 20 or supported along the elevator 14 in the same way the tube 20 is. In this way, the elevator can be used to fill grain bins without the adjustable spout 10. Also, if desired, the buckets 22 can be connected directly to the elevator spout 12.

The present invention can also be used to control the weight limits of a truck or wagon. By simply raising or lowering the auger height, the amount of grain loaded into the truck can be controlled.

The general configuration of the adjustable spout 10 can take on many forms. For example, rather than having the chain 58 and cable 40 run through the top and bottom channels 64 and 66, the winch 54 can be mounted on the side of the tube 20 with cable 40 being held away from the tube 20 by an additional pulley. The chain 58 would always remain on one side of the tube 20 depending on which side the winch is mounted on. The buckets 22 are preferably rectangular metal buckets, but could also be made of plastic and take on different shapes. Another alternative could be to use one rectangular tube in place of the two tubes that comprise the channels 64 and 66. Other ways of driving the adjustable spout 10 include using a screwdrive or a hand crank in place of the winch 54. Also, the adjustable spout could get its power from the elevator itself. Also, the present invention could be mounted in a way that allows the spout 10 to hang straight down regardless of the angle of the auger. The mounting method shown in FIG. 4 is one example of this. Note that the chain 58 and sprocket 56 could be replaced with a number of alternative structures. For example, the cable could be wound around an axle of the prime mover. Therefore, it can be seen that the present invention can take on many alternatives and modifications within the scope of the invention.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. An adjustable grain elevator spout comprising:
    a mounting portion attachable to the spout of a grain elevator;
    at least one lateral arm coupled to and extending laterally from the mounting portion;
    a movable spout having an upper portion and a lower portion, said upper portion coupled to the mounting portion such that said spout is in communication with the spout of the grain elevator, said lower portion being movable between a first and second position, said second position being toward said lateral arm;
    a cable system coupled to the movable spout proximate the lower portion, and being operatively coupled to the lateral arm; and
    a prime mover operatively coupled to the cable system for controlling the movement of the movable spout by manipulating the tensions of the cable system to move the movable spout between the first and second positions.

2. The adjustable grain elevator spout of claim 1 wherein the adjustable grain elevator spout is mounted to the grain elevator such that it has a in-use position and a stowed position.

3. The adjustable grain elevator spout of claim 2 wherein the adjustable grain elevator spout is mounted on a pivotal mount which pivots between the in-use position and the stowed position.

4. The adjustable grain elevator spout of claim 1 wherein the cable system is comprised of a set of cables and a drive chain.

5. The adjustable grain elevator spout of claim 1 wherein the prime mover is remotely controlled.

6. The adjustable grain elevator spout of claim 1 wherein the prime mover is comprised of an electric motor.

7. The adjustable grain elevator spout of claim 1 wherein the prime mover is comprised of a hand crank.

8. The adjustable grain elevator spout of claim 1 wherein the mounting portion is rotatably attached to the spout of the grain elevator such that the movable spout can be rotated about the mounting portion.

9. An adjustable spout for a grain elevator comprising:
    a movable spout coupled to the output portion of the grain elevator for directing grain from the elevator, said movable spout being supported by the grain elevator;
    a pair of lateral extensions coupled to the movable spout and each extending in generally opposite lateral directions; and
    a prime mover operatively coupled to the movable spout and the lateral extensions and supported by the grain elevator for controlling the movement of the movable spout toward one of the lateral extensions.

10. The adjustable spout of claim 9 wherein the movable spout is comprised of a series of segments, each being movable with respect to each other.

11. The adjustable spout of claim 10 wherein the segments are comprised of metal.

12. The adjustable spout of clam 10 wherein the segments are comprised of plastic.

13. The adjustable spout of claim 9 further comprising a cable set coupled between the movable spout and the prime mover.

14. An adjustable spout for a grain elevator comprising:
    a mounting tube coupled to the grain elevator, said tube being in communication with the output of the elevator;
    a movable spout having an upper and a lower end, said upper end coupled to the mounting tube and being in communication with the mounting tube;
    first and second lateral support members each having one end coupled to the mounting tube and extending in opposite directions from each other away from the mounting tube;
    first and second angle support members each having a first end coupled to the mounting tube, each of said angle support members having a second end coupled to one of the lateral support members to support the lateral support members in a lateral position;
    a first and second cable each coupled to the movable spout proximate the lower end of the movable spout; and
    a prime mover operatively coupled to the first and second cable for moving the movable spout between a first and second position by moving the cables relative to the adjustable spout.

15. The adjustable spout of claim 14 wherein said movable spout is rotatable with respect to the grain elevator.

16. The adjustable spout of claim 15 wherein the movable spout can be rotated remotely.

17. The adjustable spout of claim 14 wherein said adjustable spout is mounted to the grain elevator such that the adjustable spout has an in-use position and a stowed position.

18. The adjustable spout of claim 17 wherein the movable spout is positioned proximate the elevator while in the stowed position.

19. The adjustable grain elevator spout of claim 1 further comprising a second lateral arm coupled to and extending laterally from the mounting portion in a direction generally opposite the at least one lateral arm, wherein said first position is toward the second lateral arm and wherein said cable system is operatively coupled to the second lateral arm.

20. The adjustable spout for a grain elevator of claim 9 wherein the pair of lateral extensions are disposed in directions generally perpendicular from the elevator.

21. An adjustable grain elevator spout comprising:

a mounting portion attachable to the spout of a grain elevator;

a movable spout having an upper end and a lower end, said upper end coupled to the mounting portion such that said spout is in communication with the spout of the grain elevator, said lower end being movable between a first and second position;

a cable system coupled to opposite sides of the movable spout proximate the lower end, wherein the cable system is comprised of a set of cables and a drive chain; and a prime mover operatively coupled to the cable system for controlling the movement of the movable spout by manipulating the tensions of the cable system to move the movable spout between the first and second position.

22. The adjustable grain elevator spout of claim 1 further comprising a screw drive coupled to the prime mover to controls the movement of the movable spout.

23. The adjustable grain elevator spout of claim 1 wherein the adjustable grain elevator spout including the movable spout, the cable system, and the prime mover form a structure independent from the grain elevator.

* * * * *